Patented Nov. 26, 1940

2,223,027

UNITED STATES PATENT OFFICE 2,223,027

NONAQUEOUS DRILLING FLUID

Reginald David Dawson, Tjepoe, and Philippus Henderikus Huisman, Pangkalan Brandan, Dutch East Indies, assignors to Shell Development Company, San Francisco, Calif., a corporation of Delaware No Drawing. Application May 31, 1939, Serial No. 276,632. In the Netherlands June 2, 1938

10 Claims. (Cl. 255—1)

The present invention relates to improvements in drilling fluids for oil and gas wells and pertains more particularly to the oil-base type.

Non-aqueous drilling fluids or muds are usually prepared in a manner analogous to the preparation of clay-water base muds, that is, by suspending finely divided substances, such as haematite, galena, barytes, burnt clay, silica, crushed oyster shells, etc., in oils, e. g. mineral oils or fractions thereof such as gas oils. Various substances such as alkaline soaps, voluminous magnesium carbonate or oxide, etc., are added, if necessary, to prevent the settling out of the solid particles. It has also been proposed to add natural or synthetic asphalt for the purpose of improving the deplastering properties of these muds.

However, an outstanding deterent to the use of these nonaqueous drilling fluids is their unsatisfactory plastering properties, that is, their inability to prevent excessive loss of fluid to the formation and loss of production due to clogging of the pores of the oil-bearing formations by penetration thereinto by the drilling fluids and their contained solids. A thin, adherent and impermeable mud sheath must be formed on the walls of the borehole to prevent these undesirable occurrences.

It is therefore an object of the present invention to provide for drilling gas and oil wells a nonaqueous drilling fluid of improved plastering properties. Additional objects will be apparent from the following description.

Briefly, the invention consists in the addition of blown asphaltic bitumens to nonaqueous drilling fluids, whereby the desired plastering properties are obtained.

By "blown" asphaltic bitumens we mean asphaltic bitumens that have undergone an oxidative treatment, i. e., have been exposed to the influence of air, oxygen, chlorine, permanganate and the like at elevated temperatures, according to methods well known to those skilled in the art, and which are more commonly called simply "blown asphalts."

Drilling fluids containing blown asphalts have the property of producing in a short time a complete plastering and sealing of the borehole wall, so that loss of drilling fluid during drilling through porous strata is eliminated. Conversely, drilling fluids treated with asphaltic bitumens not previously subjected to an oxidative treatment, such as normal steam asphalts, do not show this desirable property. As illustrative of the advantages of drilling fluids prepared according to our invention, Table I shows drilling fluids containing blown and non-blown asphalts compared in a standard mudding-off machine, in which low displacement of fluid through the mud sheath is indicative of a drilling fluid having desirable plastering properties. The drilling fluids were prepared by adding 20 parts by weight of the asphalt to a suspension of 126 parts of finely divided magnetite in 64 parts of crude oil which had been topped to 200° C. The initial permeabilities of the core samples used in these tests were nearly the same.

*Table I*

| Exp. No. | Kind of asphalt | Type | Softening point (R & B) °C. | Penetration at 25° C., mm. | Viscosity of mud in degrees Mac-Michael | Ml. of displacement after— | | |
|---|---|---|---|---|---|---|---|---|
| | | | | | | 10 min. | 70 min. | 90 min. |
| 1 | No asphalt | | | | | ±25 | | |
| 2 | Netherlands Indies | Straight run | 113 | 0 | 16 | ±25 | | |
| 3 | Mexican | Non-blown | 41 | 18.5 | 5 | ±25 | | |
| 4 | do | Blown | 85 | 41 | 10 | 1.0 | 1.2 | 1.2 |
| 5 | Venezuelan | Non-blown | | | 5 | >24 | | |
| 6 | do | Blown | | | 5 | 1.5 | 1.7 | 1.7 |
| 7 | Panuco | Slightly blown | 74.5 | 33 | 6 | 12.0 | 22 | |
| 8 | do | More highly blown | 85.5 | 33 | 7 | 3.5 | 3.6 | 3.6 |
| 9 | Southern | Slightly blown | 74 | 37 | 5 | 9.2 | 17.7 | 18.8 |
| 10 | do | More highly blown | 86 | 37 | 6 | 3.4 | 3.5 | 3.5 |

It is apparent from the above table that "blown" asphalt imparts to drilling fluids the desirable plastering properties, i. e., capable of low liquid displacement, while muds treated with non-blown asphalts are poor in these properties. As will be noted, this phenomenon is independent of the source of the asphalt used.

The above-mentioned favorable property is more pronounced as the oxidative treatment of the asphalt bitumens is further continued as may be seen from Table II below. For this purpose two kilograms of an asphalt were blown as highly as possible at a temperature of 300° C. Five gram samples were taken at each period indicated in the table, and incorporated in a suspension of 126 grams of finely ground magnetite in 62.5 grams of a crude oil which had been topped to 200° C. and tested in the mudding-off machine as above.

*Table II*

| Exp. No. | Treatment of asphalt | Softening point (R & B) °C. | Penetration at 25° C., mm. | Asphaltene content, percent | Viscosity of mud in degrees MacMichael | Ml. of displacement after— | | |
|---|---|---|---|---|---|---|---|---|
| | | | | | | 1 min. | 40 min. | 90 min. |
| 1 | Original material | 54 | 45 | 19.4 | 3 | ±35 | | |
| 2 | (I) after 120 l. air | 65 | 25 | 24.9 | 3 | 21.2 | | |
| 3 | (II) after 300 l. air | 90 | 10.5 | 33.3 | 3 | 10.6 | | |
| 4 | (III) after 450 l. air | 120 | 6.5 | 39.0 | 3 | 2.5 | 10.5 | 16.3 |
| 5 | (IV) after 600 l. air | 147 | 5 | 43.1 | 4 | 0.9 | 4.7 | 7.2 |
| 6 | End product | 149 | 4.5 | 43.6 | 4 | 0.9 | 4.5 | 6.9 |

As will be seen from Table II, the improvement in plastering properties of muds increases as the degree of oxidation of the asphalt increases.

The effect of blown asphalt on the plastering properties of muds might be explained by assuming the formation, during the oxidative treatment of the asphalt bitumens of very fine solid particles which do not occur in natural or artificial asphalt bitumens and the fineness of which cannot even be approximated by very intensive grinding of solid substances, such as porcelanite or zinc oxide.

In general, a drilling fluid prepared according to the present invention contains about 5 to 15% of blown asphaltic bitumens and 30 to 60% of a finely divided solid or weighting material suspended in an oil, although greater or lesser amounts may be used, if desired.

Various weighting and settling inhibitors may be added to drilling fluids containing blown asphalts. For example, a composition which may be used for drilling wells comprises 9.8 parts by weight blown asphalt, having a softening point (R & B) of 107° C. and penetration at 25° C. of 15 mm., 49.5 parts of stove oil, and 40.7 parts of ground oyster shells. Another composition which was found to be effective in completing an oil well consisted of 51.9% absorption oil, 34.7% ground shell, 9.9% blown asphalt, having the same properties as the aforementioned asphalt, and 3.5% of a settling inhibitor, such as lampblack or carbon black.

We claim as our invention:
1. A nonaqueous drilling fluid comprising oil, finely divided solid material and blown asphaltic bitumen.
2. A nonaqueous drilling fluid comprising oil, finely ground magnetite, and blown asphaltic bitumen.
3. A nonaqueous drilling fluid comprising oil, finely ground oyster shells, and blown asphaltic bitumen.
4. A nonaqueous drilling fluid comprising oil, finely ground oyster shells, a settling inhibitor, and blown asphaltic bitumen.
5. A nonaqueous drilling fluid comprising 5 to 15% of blown asphaltic bitumens and 30 to 60% of a finely divided solid material suspended in an oil.
6. A nonaqueous drilling fluid comprising oil, finely divided solid material, blown asphaltic bitumen, and lamp black as a settling inhibitor.
7. In drilling oil and gas wells, the step of circulating in the borehole during drilling an oil-base drilling fluid comprising a blown asphaltic bitumen.
8. In drilling oil and gas wells, the step of circulating in the borehole during drilling an oil-base drilling fluid comprising a blown asphaltic bitumen and lamp black.
9. A nonaqueous drilling fluid comprising oil, a finely divided solid material, a settling inhibitor, and blown asphaltic bitumen.
10. In drilling oil and gas wells, the step of circulating in the borehole an oil base drilling fluid comprising a finely divided solid material, a settling inhibitor, and blown asphaltic bitumen.

REGINALD DAVID DAWSON.
PHILIPPUS HENDERIKUS HUISMAN.